(12) United States Patent
Chu et al.

(10) Patent No.: US 11,134,213 B2
(45) Date of Patent: Sep. 28, 2021

(54) PIXEL ARRAY AND IMAGE SENSOR

(71) Applicant: SAMSUNG ELECTRONICS CO., LTD., Suwon-si (KR)

(72) Inventors: Myunglae Chu, Suwon-si (KR); Minwoong Seo, Suwon-si (KR); Jungchak Ahn, Suwon-si (KR); Taeyon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/801,288

(22) Filed: Feb. 26, 2020

(65) Prior Publication Data
US 2020/0404207 A1  Dec. 24, 2020

(30) Foreign Application Priority Data
Jun. 18, 2019 (KR) .......................... 10-2019-0072432

(51) Int. Cl.
*H04N 5/378* (2011.01)
*H04N 5/374* (2011.01)
(Continued)

(52) U.S. Cl.
CPC ........... *H04N 5/378* (2013.01); *H04N 5/3355* (2013.01); *H04N 5/3559* (2013.01); *H04N 5/3741* (2013.01)

(58) Field of Classification Search
CPC .... H04N 5/378; H04N 5/3355; H04N 5/3559; H04N 5/3741
See application file for complete search history.

(56) References Cited

U.S. PATENT DOCUMENTS

| 6,917,027 B2 | 7/2005 | Krymski |
| 8,508,638 B2 | 8/2013 | Hynecek |

(Continued)

FOREIGN PATENT DOCUMENTS

| JP | 2003-078825 A | 3/2003 |
| JP | 5959187 B2 | 8/2016 |

(Continued)

OTHER PUBLICATIONS

Nishimura, Kazuko et al., "An 8K4K-Resolution 60fps 450ke—Saturation-Signal Organic-Photoconductive-Film Global-Shutter CMOS Image Sensor with In-Pixel Noise Canceller", ISSCC 2018 / Session 5 / Image Sensors / 5.2, p. 82-84.

(Continued)

*Primary Examiner* — Twyler L Haskins
*Assistant Examiner* — Fayez A Bhuiyan
(74) *Attorney, Agent, or Firm* — Volentine, Whitt & Francos, PLLC

(57) ABSTRACT

A pixel array includes a plurality of pixels. Each of the pixels includes a photoelectric element formed on a substrate and that generates charge from light, and a pixel circuit formed between the photoelectric element and the substrate and that outputs a digital signal value based on an amount of the generated charge. The pixel circuit includes a floating diffusion formed in the substrate and that stores the charge therein, a vertical pixel electrode that connects the floating diffusion to the photoelectric element and extends in a direction perpendicular to the substrate, an analog-to-digital converter that converts an electric potential of the floating diffusion into the digital signal value, and a memory element that stores the digital signal value.

15 Claims, 10 Drawing Sheets

(51) Int. Cl.
*H04N 5/335* (2011.01)
*H04N 5/355* (2011.01)

(56) References Cited

U.S. PATENT DOCUMENTS

| | | |
|---|---|---|
| 8,896,736 B2 | 11/2014 | Kobayashi |
| 9,386,251 B2 | 7/2016 | Onishi et al. |
| 9,491,383 B2 | 11/2016 | Boisvert et al. |
| 9,554,066 B2 | 1/2017 | Ishii et al. |
| 9,667,893 B2 | 5/2017 | Kimura et al. |
| 2015/0172573 A1 | 6/2015 | Wang et al. |
| 2017/0208273 A1 | 7/2017 | Mandelli et al. |
| 2018/0115724 A1* | 4/2018 | Motonaga ............... H04N 5/379 |
| 2018/0152650 A1 | 5/2018 | Sakakibara et al. |
| 2018/0152653 A1* | 5/2018 | Keel ....................... H04N 9/045 |
| 2019/0037159 A1 | 1/2019 | Mandelli et al. |

FOREIGN PATENT DOCUMENTS

| | | |
|---|---|---|
| JP | 2018-023170 A | 2/2018 |
| KR | 10-2018-0060308 | 6/2018 |

OTHER PUBLICATIONS

Shishido, Sanshiro et al., "210ke—Saturation Signal 3μm-Pixel Variable—Sensitivity Global-Shutter Organic Photoconductive Image Sensor for Motion Capture", ISSCC 2016/Session 6/Image Sensors/6.2, pp. 112-114.

* cited by examiner

PIXEL ARRAY AND IMAGE SENSOR

CROSS-REFERENCE TO RELATED APPLICATION

A claim for priority under 35 U.S.C. § 119 is made to Korean Patent Application No. 10-2019-0072432, filed on Jun. 18, 2019 in the Korean Intellectual Property Office, the entirety of which is hereby incorporated by reference.

BACKGROUND

The inventive concepts described herein relate to a pixel array and an image sensor including the pixel array.

Image sensors may be semiconductor-based sensors configured to receive light and generate an electric signal. Image sensors typically include a pixel array having a plurality of pixels, and a circuit configured to drive the pixel array. Image sensors are commonly used in electronic devices such as smartphones, tablet personal computers (PCs), laptop computers, televisions, and the like, in addition to cameras configured to take pictures or capture moving images. As the demand for devices and applications that utilize wavelength bands other than a visible range has recently increased, interest and research into image sensors including photoelectric elements other than semiconductor photoelectric elements has increased.

SUMMARY

Embodiments of the inventive concepts provide a pixel array and an image sensor which have enhanced reliability.

Embodiments of the inventive concepts provide a pixel array including a plurality of pixels. Each of the plurality of pixels includes a photoelectric element formed on a substrate and that generates charge from light, and a pixel circuit formed between the photoelectric element and the substrate, and that outputs a digital signal value based on an amount of the generated charge. The pixel circuit includes a floating diffusion formed in the substrate and that stores the charge therein, a vertical pixel electrode that connects the floating diffusion to the photoelectric element and that extends in a direction perpendicular to the substrate, an analog-to-digital converter that converts an electric potential of the floating diffusion into the digital signal value, and a memory element that stores the digital signal value.

Embodiments of the inventive concepts further provide an image sensor including a pixel array including pixels arranged in a matrix form in a plurality of row lines and a plurality of column lines. Each of the pixels includes a photoelectric element that generates charge in proportion to intensity of incident light, and a pixel circuit. The pixel circuit includes a floating diffusion formed in a substrate and directly connected to the photoelectric element, and that stores the charge therein, a reset transistor that provides a reset potential to the floating diffusion during a reset operation, an analog-to-digital converter that generates a digital reset value based on the reset potential during the reset operation, and a memory element that stores the digital reset value during the reset operation.

Embodiments of the inventive concepts still further provide an image sensor including a pixel array including pixels arranged in a matrix form in a plurality of row lines and a plurality of column lines, a sensor circuit that drives the pixel array, and an image processor that controls the sensor circuit and generates an image. Each of the pixels includes a photoelectric element that generates charge in proportion to an intensity of incident light, and a pixel circuit. The pixel circuit includes a floating diffusion formed in a substrate and that stores the charge generated by the photoelectric element therein, a vertical pixel electrode that connects the photoelectric element to the floating diffusion, a reset transistor that provides a reset potential to the floating diffusion in a reset section, a driver transistor that generates a signal potential according to an electric potential of the floating diffusion, an analog-to-digital converter that converts the signal potential into a digital signal value during a sampling operation and generates a digital reset value based on the reset potential during the reset operation, and a memory element that stores the digital signal value during the sampling operation and stores the digital reset value during the reset operation.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
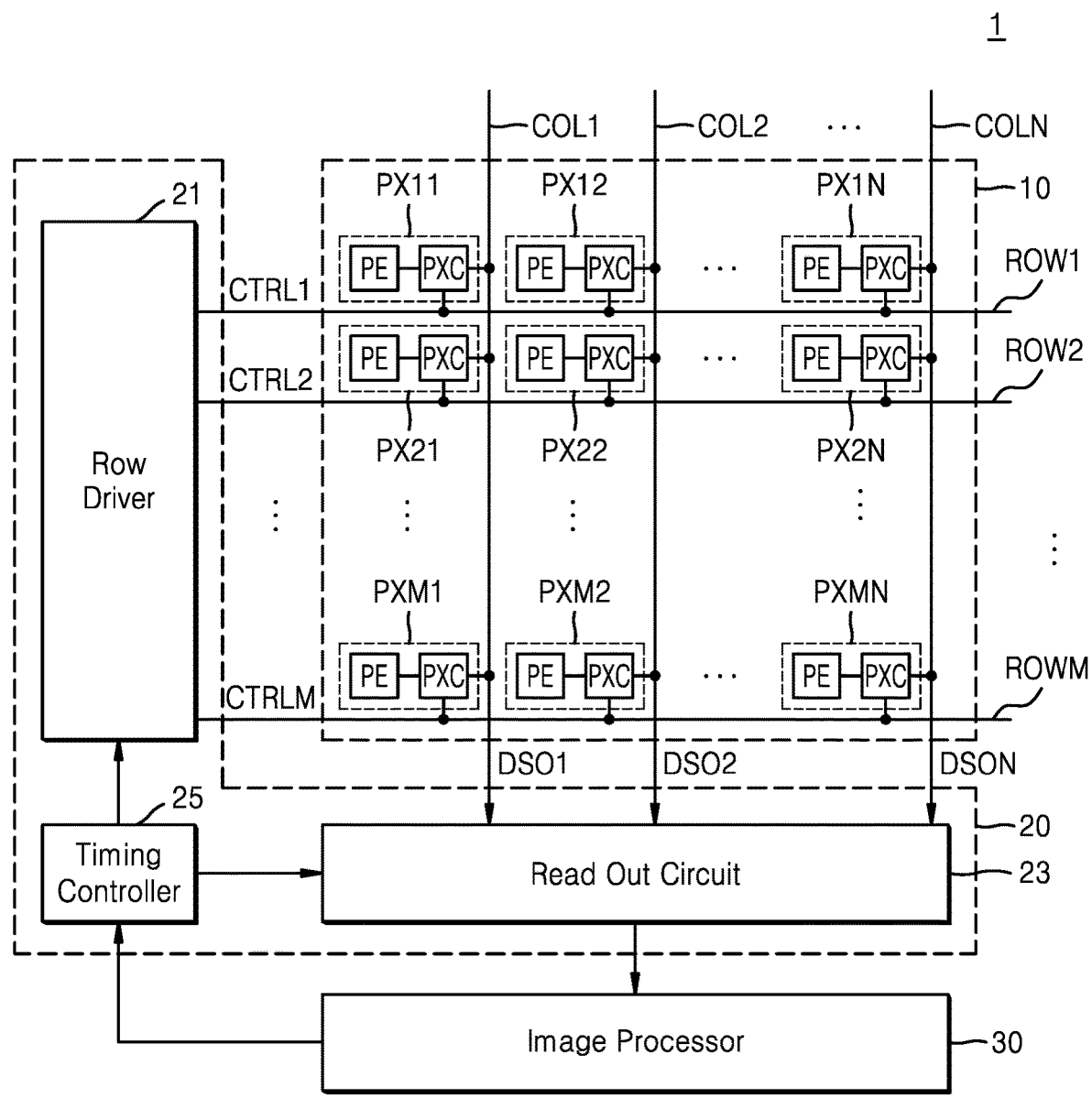
FIG. 1 illustrates a block diagram of an image sensor according to example embodiments of the inventive concepts.

FIG. 1 illustrates a block diagram of an image sensor 1 according to example embodiments of the inventive concepts.

Referring to FIG. 1, the image sensor 1 according to the embodiments may include a pixel array 10, a sensor circuit 20, and an image processor 30.

The pixel array 10 may include a plurality of pixels PX11 to PXMN, which are arranged in a plurality of row lines ROW1 to ROWM and a plurality of column lines COL1 to COLN. The plurality of pixels PX11 to PXMN may be arranged in a matrix form. Each of the pixels PX11 to PXMN may include a photoelectric element PE configured to receive light and generate charge, and a pixel circuit PXC configured to generate digital signals DSO1 to DSON based on the amount of the generated charge.

The sensor circuit 20 may include a row driver 21, a readout circuit 23, and a timing controller 25. The sensor circuit 20 may control the pixel array 10 in response to a command transmitted from the image processor 30.

The row driver 21 may generate first to M-th control signals CTRL1 to CTRLM for driving the plurality of pixels PX11 to PXMN in response to a command input by the timing controller 25. The first to M-th control signals CTRL may be transmitted through the plurality of row lines ROW1 to ROWM to the pixels PX11 to PXMN. For example, the first control signal CTRL1 may be transmitted through the first row line ROW1 to the pixels PX11 to PX1N connected to the first row line ROW1, and the second control signal CTRL2 may be transmitted through the second row line ROW2 to the pixels PX21 to PX2N connected to the second row line ROW2. The pixels PX11 to PXMN may be driven by a unit of one row line in response to the first to M-th control signals CTRL1 to CTRLM. The first to M-th control signals CTRL1 to CTRLM may include a selection signal SEL and a reset signal RS of FIGS. 2A and 2B, and a read signal RD of FIG. 7.

The readout circuit 23 may read first to N-th digital signals DSO1 to DSON from the pixels PX1 to PXMN, which are selected by the row driver 21 from among the pixels PX11 to PXMN. The first to N-th digital signals DSO1 to DSON may be respectively transmitted through the first to N-th column lines COL1 to COLN to the readout circuit 23 in sequential order. As described below, the first to N-th digital signals DSO1 to DSON may include a digital signal indicating a signal potential and a digital signal indicating a reset potential. The readout circuit 23 may perform a correlated double sampling (CDS) operation.

In the technical field of a complementary-metal-oxide-semiconductor (CMOS) image sensor, the CDS operation may include calculating a difference between a reference potential (e.g., a reset voltage of a pixel) and a signal potential (e.g., a signal potential of a sampled pixel in a sampling section) and outputting an image signal from which noise is removed. By performing the CDS operation, the readout circuit 23 may generate image data from which noise (e.g., common noise) is removed.

The timing controller 25 may operate in response to a command input by the image processor 30. The image processor 30 may control the row driver 21 and the readout circuit 23 using the timing controller 25. The image processor 30 may form an image based on image data output by the readout circuit 23. The image formed by the image processor 30 may be output to a display device or stored in a storage device, such as a memory.

Figure 2A:
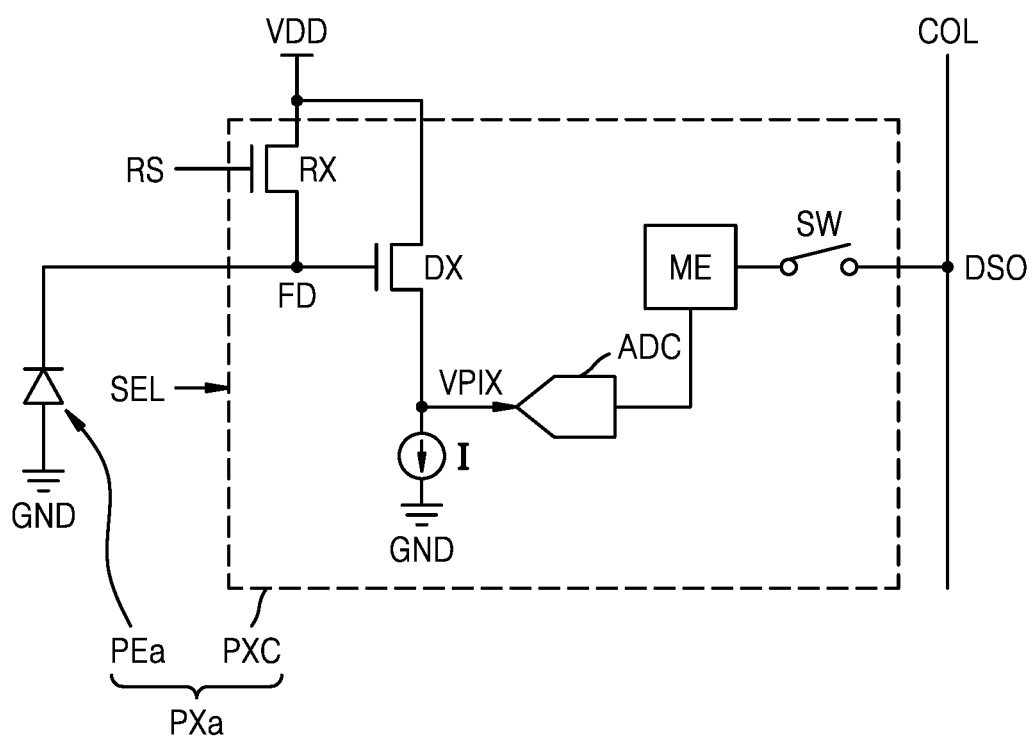
FIG. 2A illustrates a circuit diagram explanatory of pixels included in image sensors according to example embodiments of the inventive concepts.

FIG. 2A illustrates a circuit diagram of a pixel PXa according to example embodiments of the inventive concepts.

Referring to FIGS. 1 and 2A, the pixel PXa may include a photoelectric element PEa and a pixel circuit PXC.

According to embodiments, each of the pixels PX11 to PXMN in FIG. 1 may have the circuit structure of pixel PXa shown in FIG. 2A.

As external light is incident to the photoelectric element PEa, the photoelectric element PEa may generate charge in proportion to the intensity of the external light. The charge generated due to the incident light may be referred to as photocharge. According to embodiments, the photoelectric element PEa may use electrons as main charge carriers. Since the electrons are used as the main charge carriers in the embodiment shown in FIG. 2A, a ground voltage GND may be applied to one electrode (e.g., anode) of the photoelectric element PEa. Another electrode (e.g., cathode) of the photoelectric element PEa may be connected to a floating diffusion FD. Thus, the photocharge generated by the photoelectric element PEa may be collected in the floating diffusion FD or output from the floating diffusion FD.

The pixel circuit PXC may include a reset transistor RX, a driver transistor DX, an analog-to-digital converter ADC, a memory element ME, a current source T, and a switch element SW. A plurality of switch elements SW may be provided in proportion to the number of memory elements ME or may be provided in a serial manner. The pixel circuit PXC may be driven in response to reset signal RS and selection signal SEL, which are control signals CTRL1 to CTRLN generated by the row driver 21.

Here, the ground voltage GND may be a voltage of a node which is a basis for analyzing a circuit, and may be set to have an electric potential of about 0 V. By setting the ground voltage GND to 0V, a power supply voltage VDD, a reset signal RS, a selection signal SEL, a reset voltage, and a signal voltage may be defined.

A gate of the driver transistor DX may be connected to the floating diffusion FD. As the photocharge is accumulated in the floating diffusion FD, an electric potential of the floating diffusion FD may be changed. The driver transistor DX may be a source-follower buffer amplifier configured to operate due to charge accumulated in the floating diffusion FD. The current source T may operate as a bias current sink.

A power supply voltage VDD may be applied to a first electrode (e.g., a drain terminal) of the driver transistor DX. A source electrode (e.g., a source) of the driver transistor DX may be connected to the analog-to-digital converter ADC. Thus, the driver transistor DX may transmit photocharge to the analog-to-digital converter ADC. Unlike shown in FIG. 2A, in some other embodiments, the driver transistor DX may be omitted. In such a case, the floating diffusion FD may be directly connected to the analog-to-digital converter ADC.

The driver transistor DX may output a pixel voltage VPIX to the second electrode (e.g., the source). Here, the pixel voltage VPIX may be any one of a signal potential, which indicates the electric potential of the floating diffusion FD that depends on the amount of photocharge generated by the photoelectric element Pea, or and a reset potential. The pixel voltage VPIX may be an analog signal.

Since the photoelectric element PEa generates the electrons as the main charge carriers, a power supply voltage VDD may be applied to a first electrode (e.g., drain terminal) of the reset transistor RX. A second electrode (e.g., source terminal) of the reset transistor RX may be connected to the floating diffusion FD. In a reset section of operation, the reset transistor RX may provide a reset potential to the floating diffusion FD in response to a reset signal RS output by the row driver 21. In the embodiment shown in FIG. 2A, the reset potential may be the power supply voltage VDD. Thus, directly after a reset operation is performed, the electric potential of the floating diffusion FD may be substantially equal to the power supply voltage VDD (i.e., reset voltage).

Here, when the electric potential of the floating diffusion FD is referred to as being substantially equal to the power supply voltage VDD, the electric potential of the floating diffusion FD may be substantially equal to the power supply voltage VDD within a tolerance limit of a circuit operation. An electric potential of the reset floating diffusion FD may differ from the power supply voltage VDD by at least reset noise. The reset noise may include, for example, flicker noise and thermal noise (KTC noise).

In the reset section, the reset voltage, which is an electric potential of the reset floating diffusion FD, may be transmitted via the driver transistor DX to the analog-to-digital converter ADC. That is, in the reset section, the pixel voltage VPIX may be a reset voltage.

The analog-to-digital converter ADC may generate a digital signal DSO based on the pixel voltage VPIX. The digital signal DSO may include a digital signal value obtained by digitizing the signal potential and a digital reset value obtained by digitizing the reset potential. Here, as described above, the signal potential may be the electric potential of the floating diffusion FD, which depends on the amount of charge generated by the photoelectric element PEa.

The generation of the digital signal DSO may include comparing a ramp voltage, which varies at a predetermined slope, with the pixel voltage VPIX and counting the number of clocks during a section for which the ramp voltage is higher than the pixel voltage VPIX (or during a section for which the ramp voltage is lower than the pixel voltage VPIX). In the embodiment of FIG. 2A, the ramp voltage may be a voltage that is reduced with time.

At least one of the digital signal value and the digital reset value may be stored in the memory element ME. The memory element ME may store each of the digital signal value and the digital reset value or store only the digital reset value.

The switch element SW may be connected between the memory element ME and a column line COL. At least one of the stored digital signal value and the stored digital reset value may be read in response to a readout signal of the readout circuit 23. Here, the readout signal may be a selection signal SEL or a signal (e.g., a read signal RD of FIGS. 7 and 8) generated from the selection signal SEL. More specifically, the switch element SW may be turned on in response to the readout signal and thus, the digital signal stored in the memory element ME may be transmitted via the switch element SW and the column line COL to the readout circuit 23. Here, the column line COL may be any one of the first to N-th column lines COL1 to COLN of FIG. 1.

According to embodiments, each of the digital signal value and the digital reset value may be read from the memory element ME in response to the readout signal. According to other embodiments, the digital reset value may be read from the memory element ME in response to the readout signal, and the digital signal value may be read from the analog-to-digital converter ADC in response to the readout signal.

Figure 2B:
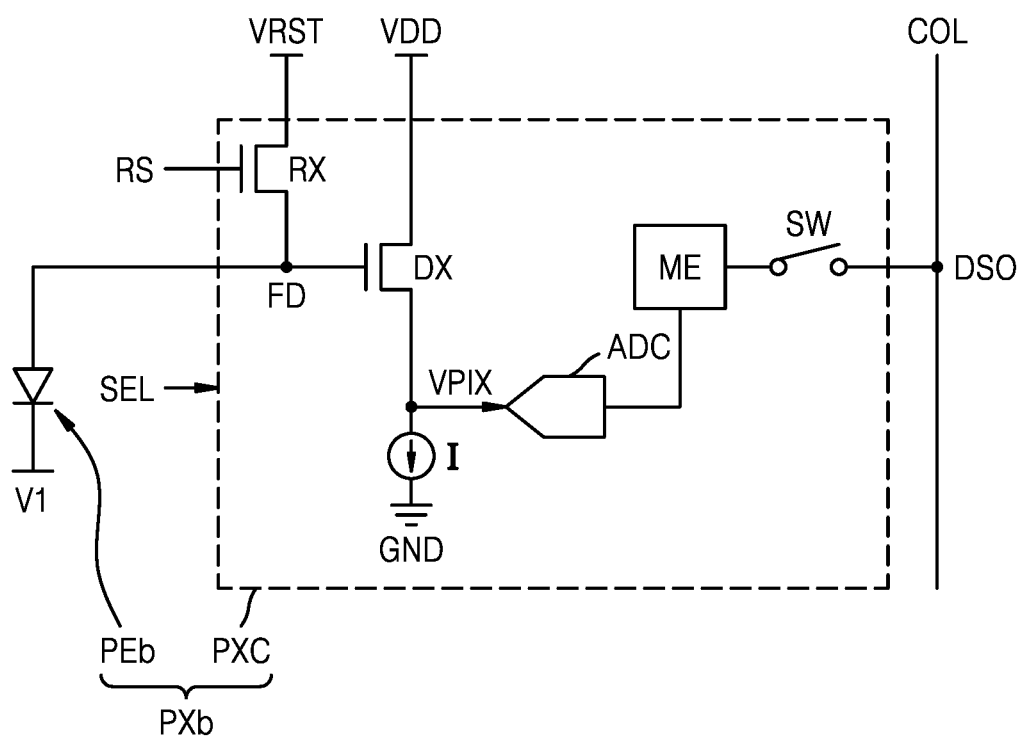
FIG. 2B illustrates a circuit diagram explanatory of pixels included in image sensors according to example embodiments of the inventive concepts.

FIG. 2B illustrates a circuit diagram of a pixel PX according to example embodiments of the inventive concepts.

Referring to FIGS. 1 and 2B, the pixel PXb may include a photoelectric element PEb and a pixel circuit PXC.

Description of structure and functionality of circuit elements in FIG. 2B that is substantially the same as in FIG. 2A will be omitted from the following for brevity, and differences between FIGS. 2A and 2B will be mainly described.

According to embodiments, a circuit structure of each of the pixels PX11 to PXMN in FIG. 1 may be the same as the pixel PXb shown in FIG. 2B.

The photoelectric element PEb of FIG. 2B may generate holes as main charge carriers unlike the photoelectric element PEa of FIG. 2A. According to embodiments, one electrode (e.g., an anode) of the photoelectric element PEb may be connected to a floating diffusion FD. According to embodiments, a first voltage may be applied to another electrode (e.g., a cathode) of the photoelectric element PEb. According to example embodiments, a first voltage V1 may have a value of several volts (V), for example, about 3.0 V.

A reset voltage VRST having a different value from a power supply voltage VDD may be applied to a first electrode (e.g., a drain terminal) of a reset transistor RX. In a reset section of operation, the reset transistor RX may provide the reset voltage VRST to the floating diffusion FD in response to a reset signal RS output by a row driver 21. Thus, an electric potential of the floating diffusion FD may be substantially equal to the reset voltage VRST.

An analog-to-digital converter ADC may generate a digital signal DSO based on a pixel voltage VPIX. In the embodiment of FIG. 2B, a ramp voltage may be used to generate the digital signal DSO, and the ramp voltage may be a voltage that increases with time.

According to embodiments, since the pixel PXb includes the photoelectric element PEb using holes as main charge carriers, dark current characteristics of the pixel PXb may be improved.

Figure 3:
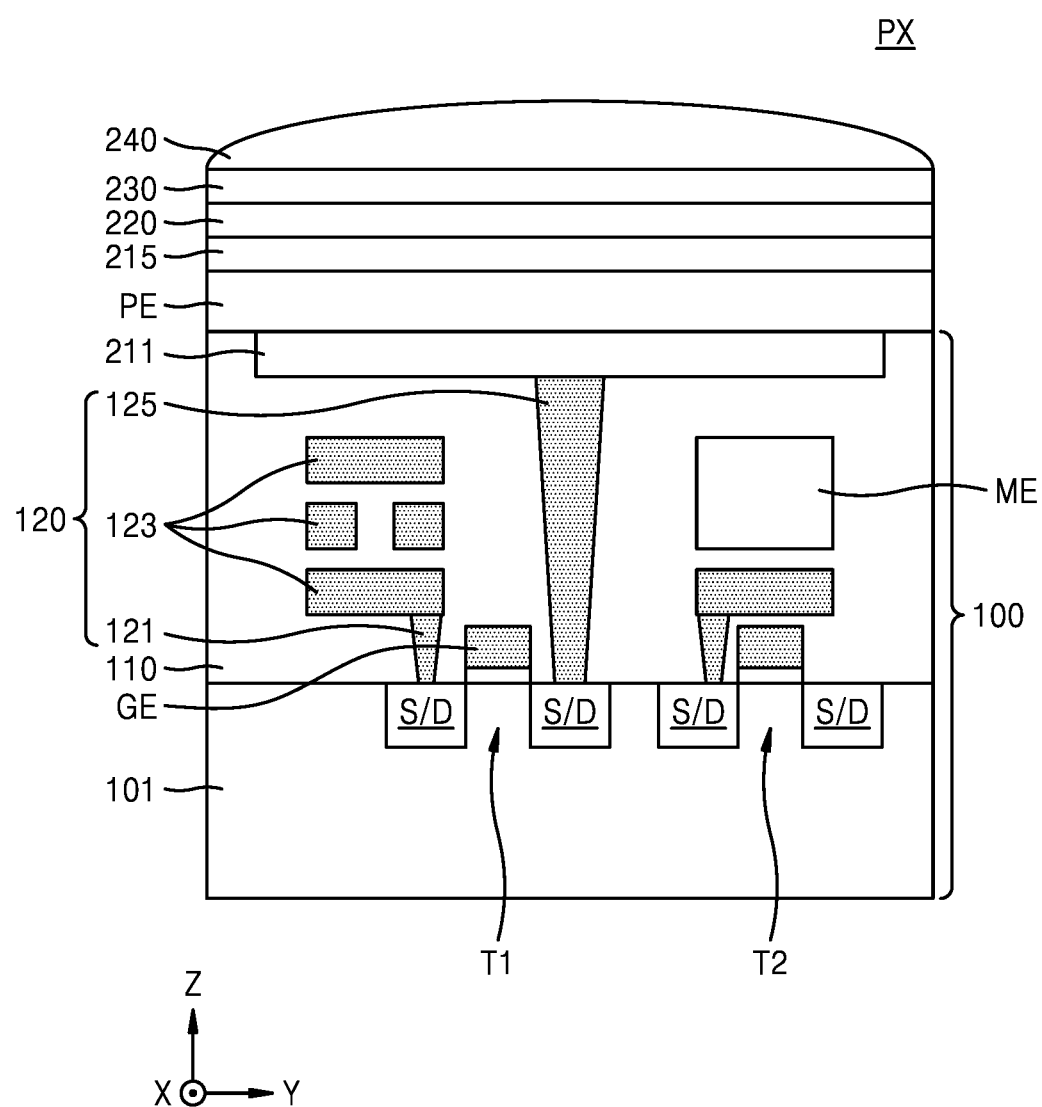
FIG. 3 illustrates a cross-sectional view explanatory of pixels included in image sensors according to example embodiments of the inventive concepts.

FIG. 3 illustrates a cross-sectional view of a pixel PX according to example embodiments of the inventive concepts. The pixel PX of FIG. 3 may correspond to any one of the pixels PXa and PXb of FIGS. 2A and 2B.

Referring to FIG. 3, the pixel PX may include a circuit portion 100 and a photoelectric element PE located on the circuit portion 100.

The circuit portion 100 may constitute the pixel circuit PXC of FIGS. 2A and 2B. The pixel PX may operate using any one of the methods described with reference to FIGS. 2A and 2B. Also, the photoelectric element PE may be any one of the photoelectric elements PEa and PEb of FIGS. 2A and 2B.

Here, a direction (i.e., a normal direction) perpendicular to a top surface of a substrate 101 may be defined as a first direction (Z direction), and two directions which are parallel to the top surface of the substrate 101 and perpendicular to each other may be respectively defined as a second direction and a third direction (X and Y directions). Alternatively, the first direction (Z direction) may also be referred to as a vertical direction, and the second and third direction (X and Y directions) may also be referred to as lateral directions.

The substrate 101 may be a semiconductor substrate. The substrate 101 may be, for example, a silicon-on-insulator (SOI) substrate. The substrate 101 may be a bulk silicon substrate, an SOI substrate, a germanium substrate, a germanium-on-insulator (GOI) substrate, a silicon-germanium substrate, or an epitaxial thin-film substrate obtained by performing a selective epitaxial growth (SEG) process. The substrate 101 may for example include at least one of silicon (Si), germanium (Ge), silicon germanium (SiGe), gallium arsenide (GaAs), indium gallium arsenide (InGaAs), aluminium gallium arsenide (AlGaAs), or a mixture thereof. The substrate 101 may be doped with a P-conductivity-type dopant.

Source/drain regions SD may be formed in the substrate 101. The source/drain regions SD may be doped with, for example, an N-conductivity-type dopant. Any one of the source/drain regions SD may correspond to the floating diffusion FD of FIGS. 2A and 2B. One of the source/drain regions SD corresponding to the floating diffusion FD of FIGS. 2A and 2B may be in contact with a vertical pixel electrode 125.

A plurality of gate electrodes GE may be formed on the substrate 101. The gate electrodes GE may include a gate conductive layer and a gate insulating layer located under the gate conductive layer. According to embodiments, the gate conductive layer may include a conductive material, such as a metal, and the gate insulating layer may include an insulating material, such as silicon oxide. The gate electrodes GE and the source/drain regions S/D may constitute first and second transistors T1 and T2.

The first transistor T1 may correspond to the reset transistor RX of FIGS. 2A and 2B. The second transistor T2 may include at least one of a transistor included in the analog-to-digital converter ADC of FIGS. 2A and 2B and a driver transistor DX.

An insulating layer 110 may be located on the substrate 101. The insulating layer 110 may cover the gate electrodes GE. The insulating layer 110 may include an insulating material, such as for example $SiO_2$, SiN, $Al_2O_3$, and $HfO_x$ (x is a rational number). The insulating layer 110 may be formed by integrally forming a plurality of insulating material films at different levels.

A conductive interconnection 120 may be formed in the insulating layer 110. The conductive interconnection 120 may include conductive vias 121, conductive patterns 123, and the vertical pixel electrode 125. Vertical pixel electrode 125 may for example include a metal material. A structure in which the conductive interconnection 120 including a plurality of conductive layers located at different levels is covered with the insulating layer 110 may also be referred to as a metal-insulator-metal (MIM) structure and be formed using a Back End of Line (BEOL) process.

A plurality of conductive patterns 123 may be located at different levels and extend in a lateral direction. The conductive vias 121 may extend in a vertical direction (e.g., a first direction (or Z direction)). The conductive vias 121 may connect the conductive patterns 123, which are formed at different levels, to each other. The conductive vias 121 may connect partial regions (e.g., the conductive patterns 123 and the source/drain regions S/D) of the substrate 101.

A photoelectric element PE may be located on the insulating layer 110. The photoelectric element PE may be in contact with a lower electrode 211 and an upper electrode 215. The lower and upper electrodes 211 and 215 may have large horizontal sectional areas and thus, the lower and upper electrodes 211 and 215 may have lower contact resistances with the photoelectric element PE. The vertical pixel electrode 125 may extend in a vertical direction (e.g., the first direction (or Z direction)). The vertical pixel electrode 125 may be connected to source/drain regions SD, which correspond to the lower electrode 211 and the floating diffusion 1-1) of FIGS. 2A and 2B. Thus, an electrical path for allowing photocharge generated by the photoelectric element PE to move to the floating diffusion FD may be formed.

A memory element ME may be located on the substrate 101. The memory element ME may be provided using a BEOL process. According to embodiments, the memory element ME may be located at the same level as at least some of the conductive patterns 123. According to embodiments, the memory element ME may horizontally overlap at least a portion of the vertical pixel electrode 125.

According to embodiments, the memory element ME may be a dynamic random access memory (DRAM) device. According to other embodiments, the memory element ME may be for example any one of phase-change RAM (PRAM), spin transfer torque-magnetic RAM (STT-MRAM), and resistive RAM (ReRAM), or the like.

The photoelectric element PE may be located on the insulating layer 110. The photoelectric element PE may be located at a different vertical level from the circuit portion 100 and may vertically overlap the circuit portion 100. The photoelectric element PE may be a photoelectric conversion element other than a semiconductor-based photoelectric element. For example, in an embodiment the photoelectric element PE does not include a silicon (Si) material. According to embodiments, the photoelectric element PE may be any one of quantum-dot photodiode, organic photoconductive film, and a Perovskite photodiode. The photoelectric element PE may generate photoelectrons using visible light and infrared (IR) light.

The upper electrode 215 may provide a voltage for operating the photoelectric element PE, for example, the ground voltage GND of FIG. 2A or the first voltage V1 of FIG. 2B. The lower and upper electrodes 211 and 215 may include a transparent conductive material, such as for example indium tin oxide (ITO), indium zinc oxide (IZO), zinc oxide (ZnO), or tin oxide ($SnO_2$), or the like.

A protective layer 220 may protect the upper electrode 215 and the photoelectric element PE on the upper electrode 215.

A color filter 230 may be a band-pass filter (BPF) configured to allow only light in a partial band, from among light incident to each pixel PX. Accordingly, the photoelectric element PE may receive light having a wavelength corresponding to a pass band of the color filter 230. Adjacent pixels PX may include color filters 230 having different pass bands or color filters 230 having substantially the same pass band.

A microlens 240 may be located on the color filter 230 and may widen a light-receiving angle of each pixel PX by condensing external light.

Figure 4:
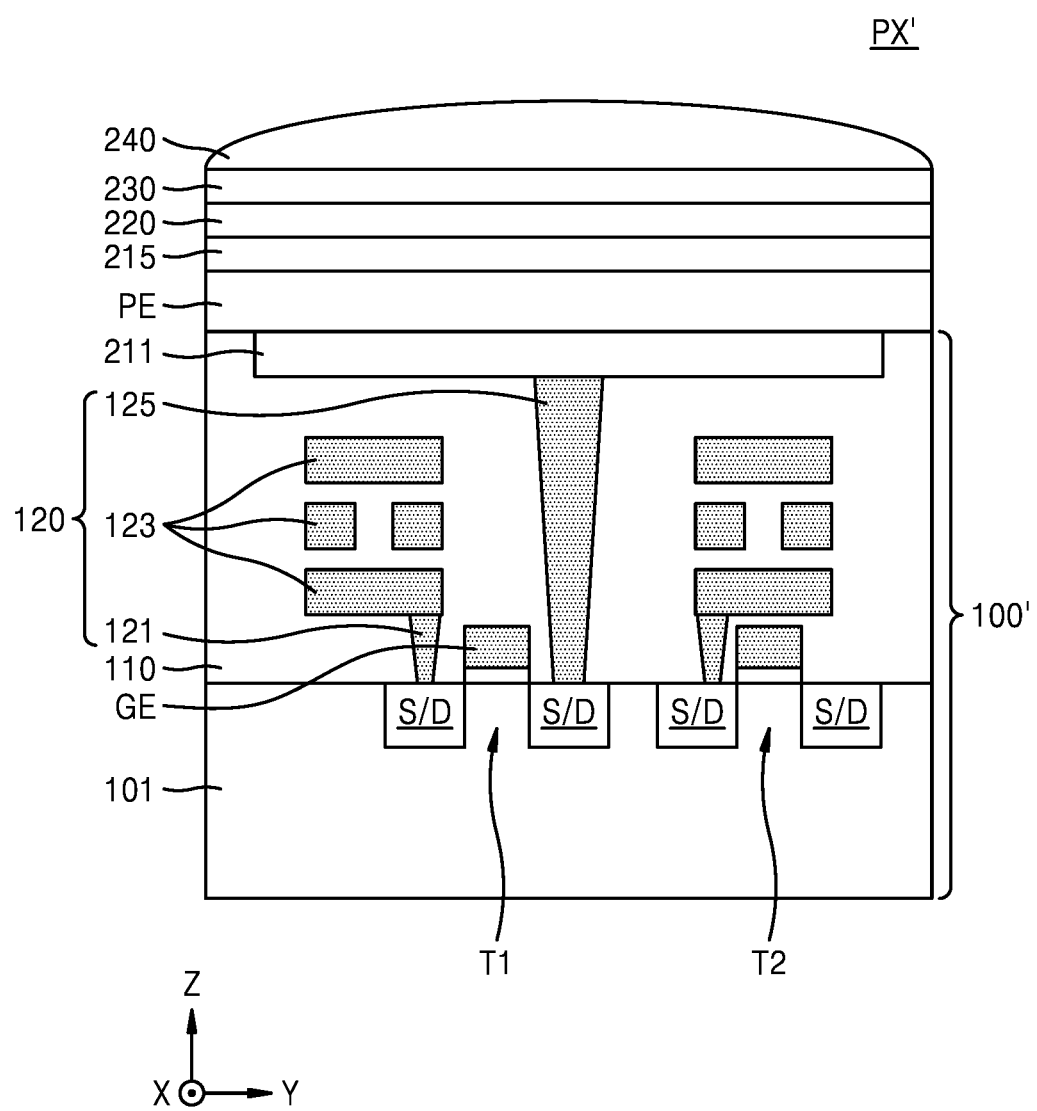
FIG. 4 illustrates a cross-sectional view explanatory of pixels included in image sensors according to example embodiments of the inventive concepts.

FIG. 4 illustrates a cross-sectional view of a pixel PX' according to example embodiments of the inventive concepts. The pixel PX' of FIG. 4 may correspond to any one of the pixels PXa, PXb of FIGS. 2A and 2B.

Descriptions of structural features in FIG. 4 that are substantially the same as in FIG. 3 will be omitted for brevity, and differences between the structures in FIGS. 3 and 4 will be mainly described.

Referring to FIG. 4, the pixel PX' may include a circuit portion 100' and a photoelectric element PE located on the circuit portion 100'.

The circuit portion 100' may constitute the pixel circuit PXC of FIGS. 2A and 2B. The pixel PX' may operate using any one of the methods described with reference to FIGS. 2A and 2B.

Referring to FIG. 4, a memory element may be formed at a lower vertical level than conductive patterns 123. According to embodiments, the memory element may be a static RAM (SRAM) device. According to embodiments, the memory element may include a plurality of second transistors T2. Thus, the memory element may be located at the same level as a first transistor T1. For example, the memory element may be formed at a same level as the reset transistor RX.

Figure 5:
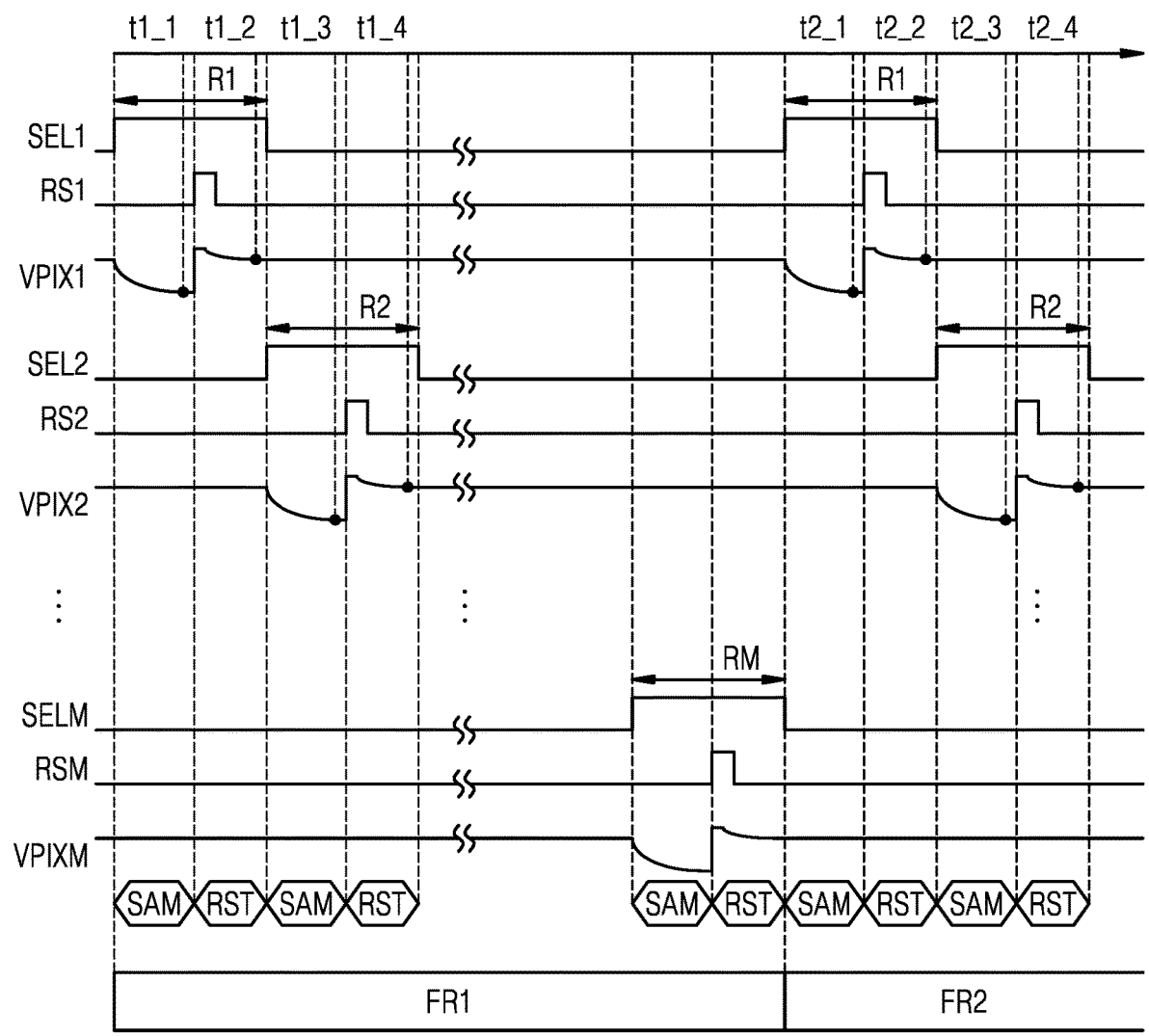
FIG. 5 illustrates a graph explanatory of operation of an image sensors of FIG. 2A according to example embodiments of the inventive concepts.

FIG. 5 illustrates a graph explanatory of operations of an image sensor (refer to 1 in FIG. 1) including the pixel PXa of FIG. 2A.

More specifically, FIG. 5 illustrates first to M-th selection signals SEL1 to SELM and first to M-th reset signals RS1 to RSM, which are control signals (refer to CTRL in FIG. 1) applied to first to M-th row lines (refer to ROW1 to ROWM in FIG. 1), and first to M-th pixel voltages (VPIX1 to VPIXM, refer to VPIX in FIG. 2A) corresponding thereto.

First to M-th row periods R1 to RM may be time sections (or durations in time) that occur in sequential order. Here, the first to M-th row periods R1 to RM may be time durations for which pixels PX11 to PXMN respectively and sequentially connected to the first to M-th row lines ROW1 to ROWM are driven.

More specifically, in the first to M-th row periods R1 to RM, i) photoelectric elements PE included in the pixels PX11 to PXMN connected to the first to M-th row lines ROW1 to ROWM may generate photocharge, ii) driver transistors DX corresponding respectively thereto may output first to M-th pixel voltages VPIX1 to VPIXM by using the generated photocharge, iii) analog-to-digital converters ADC corresponding respectively thereto may generate digital signals based on the first to M-th pixel voltages VPIX1 to VPIXM, iv) memory elements ME corresponding respectively thereto may store the digital signals, and v) the digital signals stored in the memory elements ME may be output through the first to N-th column lines COL1 to COLN.

For example, the first row period R1 may be a time duration during which i) the driver transistors DX included in the pixels PX11 to PX1N connected to the first row line ROW1 generate the first pixel voltages VPIX1 using charge generated by the photoelectric elements PE included in the pixels PX11 to PX1N connected to the first row line ROW1, ii) the analog-to-digital converters ADC included in the pixels PX11 to PX1N connected to the first row line ROW1 respectively generate digital signals based on the first pixel voltages VPIX1, iii) the digital signals are respectively stored in the memory elements ME, and iv) the digital signals stored in the memory elements ME are then respectively read from the first to N-th column lines COL1 to COLN. In the second row period R2 that is subsequent to the first row period R1, similar operations may be performed on the pixels PX21 to PX2N connected to the second row line ROW2.

Each of first and second frame periods FR1 and FR2 may include row periods, which are provided in equal number to the number of row lines included in the image sensor 1 of FIG. 1. Each of the first and second frame periods FR1 and FR2 may include first to M-th row periods R1 to RM. Each of the first and second frame periods FR1 and FR2 may be a time duration taken to sequentially drive all of the first to M-th row lines ROW1 to ROWM.

Referring to FIGS. 1, 2A, and 5, in the first to M-th row periods R1 to RM, the pixels PX11 to PXMN that are respectively and sequentially connected to the first to M-th row lines ROW1 to ROWM may be selected.

Each of the first to M-th row periods R1 to RM may include a sampling section SAM configured to detect a signal voltage, and a reset section RST configured to detect a reset voltage. In FIG. 5 the sampling section SAM is illustrated as being longer than the reset section RST in FIG. 5, but is not limited thereto.

After a first row period R1 of a first frame period 1-R1 begins, first pixel voltages VPIX1 of pixels PX11 to PX1N connected to the first row line ROW1 may be output through corresponding driver transistors DX to the corresponding analog-to-digital converters ADC of pixels PX11 to PX1N connected to the first row line ROW1 at a time point t1_1. A first pixel voltage VPIX1 output at the time point t1_1 may be a signal potential of a corresponding floating diffusion FD, which is proportional to the amount of photocharge generated by the corresponding photoelectric element PE. The corresponding analog-to-digital converter ADC may generate a digital signal value based on the signal potential. The generated digital signal value may be stored in the corresponding memory element ME.

At a time point t1_2 that comes after the time point t1_1, the floating diffusions FD of the pixels PX11 to PX1N connected to the first row line ROW1 may be reset. At the time point t1_2, the first pixel voltages VPIX1 may be output through the driver transistors DX to the corresponding analog-to-digital converters ADC. A first pixel voltage VPIX1 output at the time point t1_2 may have a reset potential. The corresponding analog-to-digital converter ADC may generate a digital reset value based on the reset voltage. The generated digital reset value may be stored in the corresponding memory element ME.

In the pixel PXa according to the example embodiments, the photoelectric element PE may be directly connected to the floating diffusion FD so that an additional transfer transistor is not located therebetween. For example, the photoelectric element PE may be characterized as shorted with the floating diffusion FD. The floating diffusion FD may be connected to the photoelectric element by a conductive interconnection made of a metal material. Thus, in each of the first and second frame periods FR1 and FR2, the digital signal value may be generated first, and then the digital reset value may be generated.

At a time point t2_1 of the first row period R1 of the second frame period FR2, digital signal values of the pixels PX11 to PX1N connected to the first row line ROW1 may be stored in the memory elements ME in the same manner as at the time point t1_1.

At a time point t2_2 of the first row period R1 of the second frame period FR2, digital reset values of the pixels PX11 to PX1N connected to the first row line ROW1 may be stored in the memory elements ME in the same manner as at the time point t1_2.

Digital signal values of the pixels PX21 to PX2N connected to the second row line ROW2 may be stored in the memory elements ME at a time point t1_3 and a time point t2_3. Digital reset values of the pixels PX21 to PX2N connected to the second row line ROW2 may be stored in the memory elements ME at a time point t1_4 and a time point t2_4.

When a CDS operation is performed using a digital signal value and a digital reset value included in the same frame period, for example when a CDS operation is performed using a digital signal value stored at the time point t1_1 and a digital reset value stored at the time point t1_2, the digital signal value and the digital reset value may include different reset noise components. During a reset operation, undesired migration of charge may cause KTC noise. Due to the KTC noise, a reset potential may vary according to each frame period. Therefore, even if the CDS operation is performed, noise (e.g., reset noise) may not be removed.

According to some embodiments of the inventive concepts, readout circuit 23 may calculate a difference between a digital signal value and a digital reset value, which are generated in different frame periods. More specifically, the readout circuit 23 may calculate (i.e., determine) respective differences between the digital signal values detected from the first pixels PX11 to PX1N and stored in the corresponding memory elements ME at the time point t2_1 of second frame period FR2, and the digital reset values detected from the first pixels PX11 to PX1N and stored in the corresponding memory elements ME at the time point t1_2 of the first frame period FR1. For example, the readout circuit 23 may calculate (i.e., determine) the difference between the digital signal value detected from the first pixel PX11 and stored in the corresponding memory element ME at the time point t2_1 of second frame period FR2, and the digital reset value detected from the first pixel PX11 and stored in the corresponding memory element ME at the time point t1_2 of the first frame period FR1.

In this case, since a digital reset value stored at the time point t1_2 corresponds to an electric potential of a floating diffusion FD before the accumulation of charge of a corresponding digital signal value stored at the time point t2_1, a true CDS (TCDS) operation from which reset noise is removed may be performed by comparing the digital reset value stored at the time point t1_2 with the digital signal value stored at the time point t2_1. The TCDS operation may be performed in a digital domain.

Figure 6:
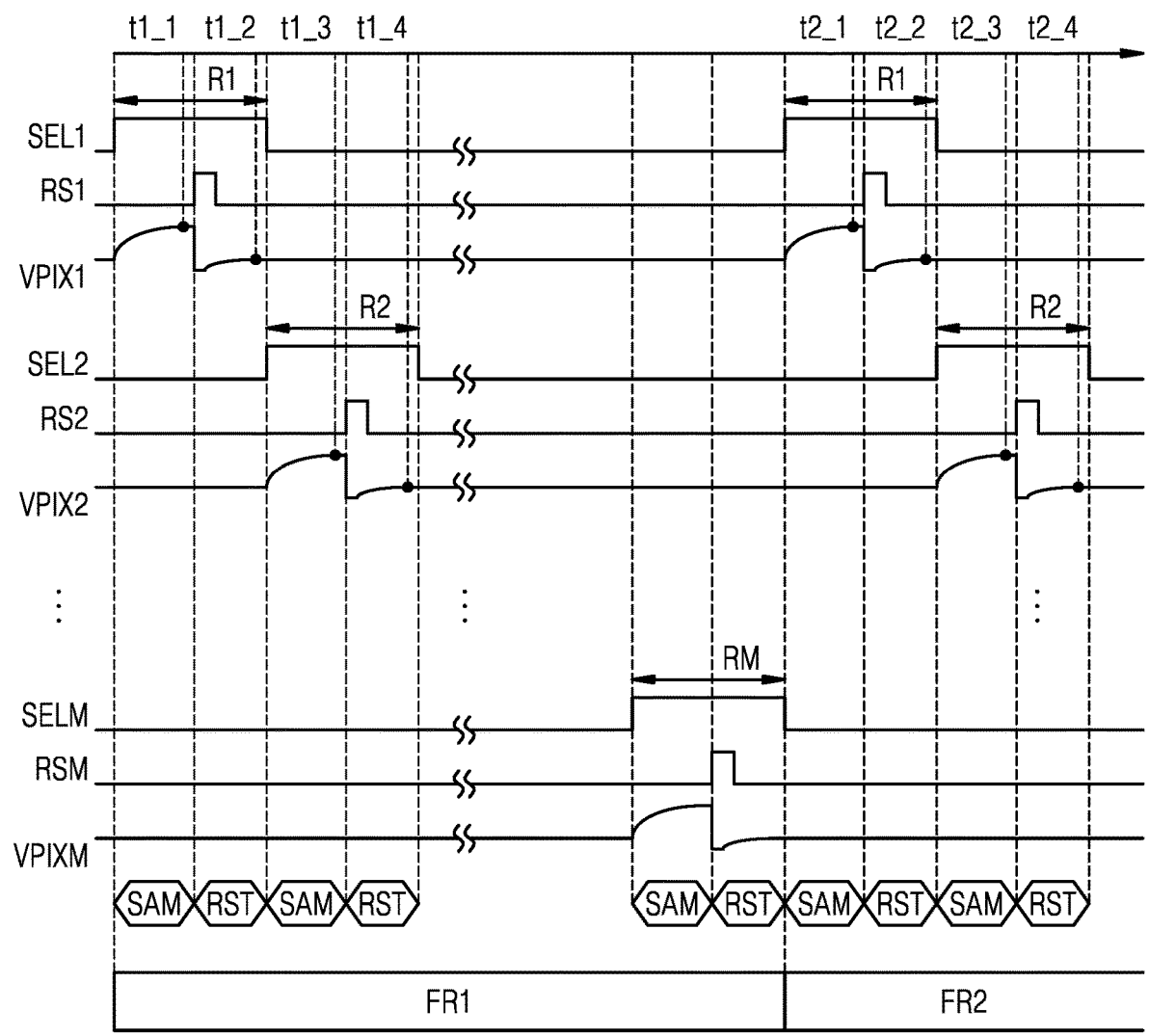
FIG. 6 illustrates a graph explanatory of operation of an image sensors of FIG. 2B according to example embodiments of the inventive concepts.

FIG. 6 illustrates a graph explanatory of operations of an image sensor (refer to 1 in FIG. 1) including the pixel PXb of FIG. 2B.

For convenience, description of features in FIG. 6 which are substantially the same as in FIG. 5 will be omitted for brevity, and differences between operations in FIGS. 5 and 6 will be mainly described.

Operations of the image sensor according to embodiments shown in FIG. 6 may be similar to operations of the image sensor according to the embodiments shown in FIG. 5. However, the embodiments shown in FIG. 6 pertain to the pixel PXb of FIG. 2B, more specifically, a case in which holes are used as main charge carriers. Accordingly, signal voltages VPIX may be increased or reduced in opposite directions to the embodiment shown in FIG. 5. For example, in FIG. 6 first pixel voltages VPIX1 increase during the sampling section SAM at the time point t1_1, in contrast to FIG. 5 wherein corresponding first pixel voltages VPIX1 decrease during sampling section SAM at the time point t1_1.

Referring to FIGS. 1, 2B, and 6, similar to as described with respect to FIG. 5, readout circuit 23 may calculate a difference between a digital signal value stored in a memory element ME at a time point t2_1 of a second frame period FR2 and a digital reset value stored in the memory element ME at a time point t1_2 of a first frame period FR1. Thus, a TCDS operation may be performed in a digital domain.

Figure 7:
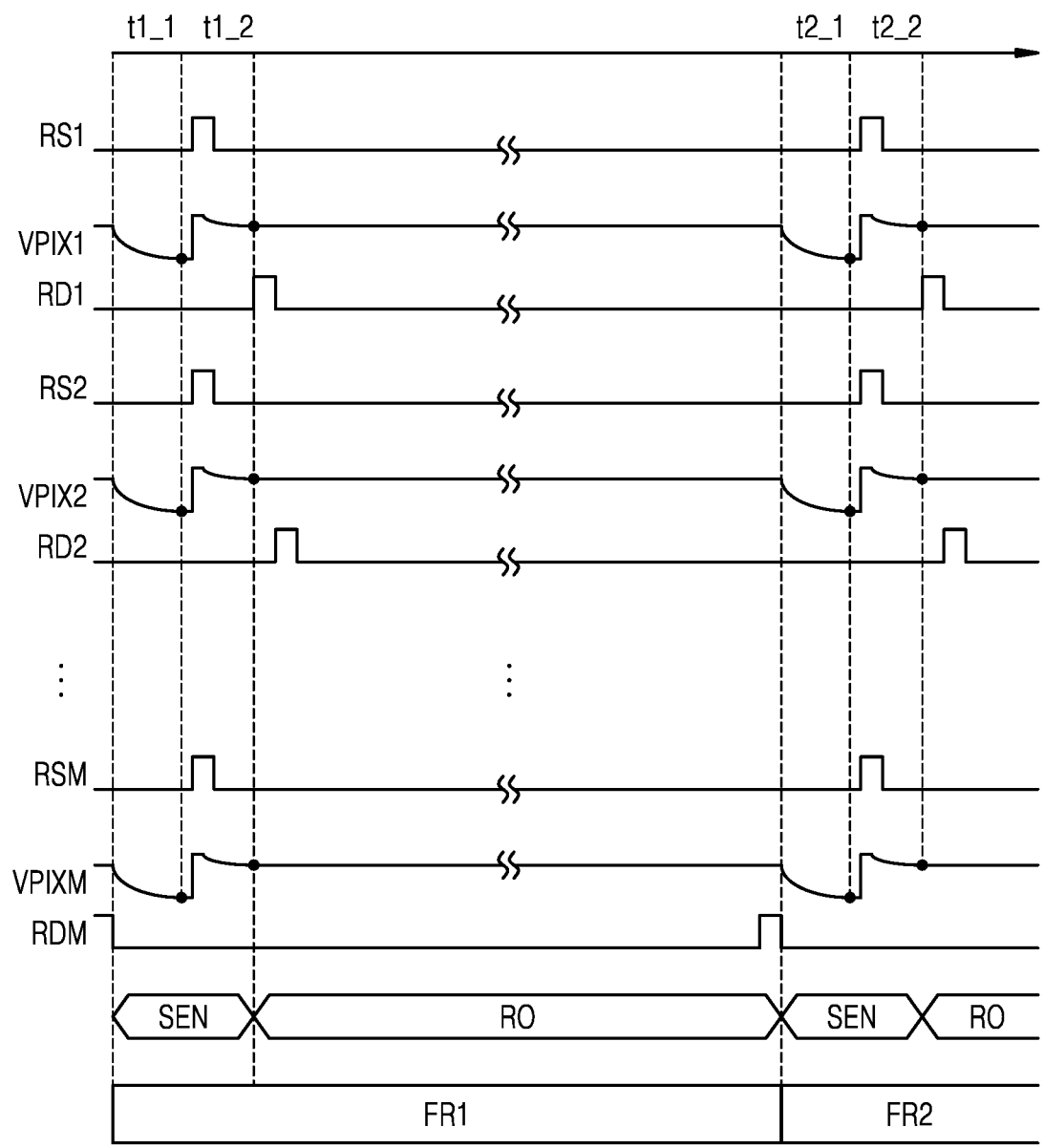
FIG. 7 illustrates a graph explanatory of operation of an image sensors of FIG. 2A according to example embodiments of the inventive concepts.

FIG. 7 illustrates a graph explanatory of operations of an image sensor according to some embodiments of the inventive concepts.

Description of features in FIG. 7 which are substantially the same as in FIG. 5 will be omitted for brevity, and differences between FIGS. 5 and 7 will be mainly described.

Referring to FIGS. 1, 2A, and 7, unlike in FIG. 5, each of first and second frame periods FR1 and FR2 in FIG. 7 may include a sensing section SEN and a read section RO. The sensing section SEN may be a section for which pixels PX11 to PXMN generate data (e.g., digital signal values and digital reset values) about images responsive to incident light. The read section RO may be a section for which data (e.g., digital signal values and digital reset values) about the images stored in the pixels PX11 to PXMN are read.

The pixels PX11 to PXMN connected to first to M-th row lines ROW1 to ROWM may simultaneously sense external light.

According to some embodiments, all the pixels PX11 to PXMN may substantially simultaneously sense external light and thus, distortion caused by an external light source or the movement of a subject may be reduced. At time point t1_1 and time point t2_1, each of the pixels PX11 to PXMN may output a pixel voltage VPIX1 corresponding to photocharge generated by a corresponding photoelectric element Pea, and generate and store a digital signal value in the corresponding memory element ME based on the pixel voltage VPIX1. At time point t1_2 and time point t2_2, each of the pixels PX11 to PXMN may output a pixel voltage VPIX1 caused by a reset operation, and generate and store a digital reset value in a corresponding memory element ME based on the pixel voltage VPIX1.

Data (e.g., the digital signal values and the digital reset values) about the images respectively stored in the pixels PX11 to PXMN connected to the first to M-th row lines ROW1 to ROWM may be sequentially read based on a read signal RD. For example, data (e.g., the digital signal values and the digital reset values) of the images stored in the pixels PX11 to PX1N connected to the first row lines ROW1 may be read, and then data (e.g., the digital signal values and the digital reset values) about the images stored in the pixels PX21 to PX2N connected to the second row lines ROW2 may be read responsive to read signal RD1. Similar to the description made with respect to FIG. 5, the read out circuit 23 may perform a TCDS operation in a digital domain based on the read out data.

Figure 8:
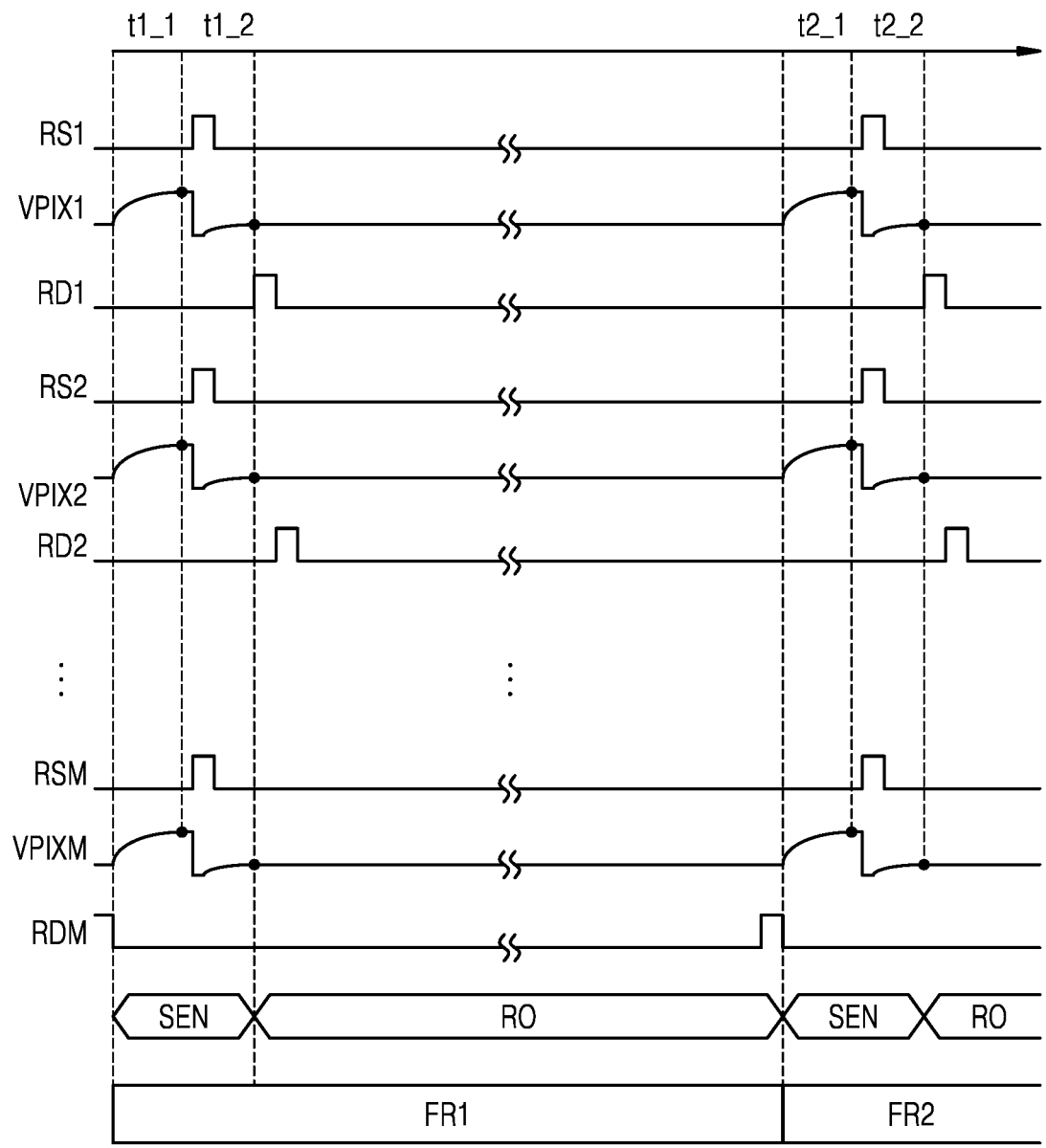
FIG. 8 illustrates a graph explanatory of operation of an image sensors of FIG. 2B according to example embodiments of the inventive concepts.

FIG. 8 illustrates a graph explanatory of operations of an image sensor according to some embodiments of the inventive concepts.

Description of features in FIG. 8 which are substantially the same as in FIG. 7 will be omitted for brevity, and differences between FIGS. 7 and 8 will be mainly described.

The operation of the image sensor according to the embodiments shown in FIG. 8 may be similar to the operation of the image sensor according to the embodiments shown in FIG. 7. However, the embodiment shown in FIG. 8 pertains to the pixel PXb of FIG. 2B and shows a case in which holes are used as main charge carriers. Accordingly, signal voltages VPIX may be increased or reduced in opposite directions to the embodiment shown in FIG. 7.

Figure 9:
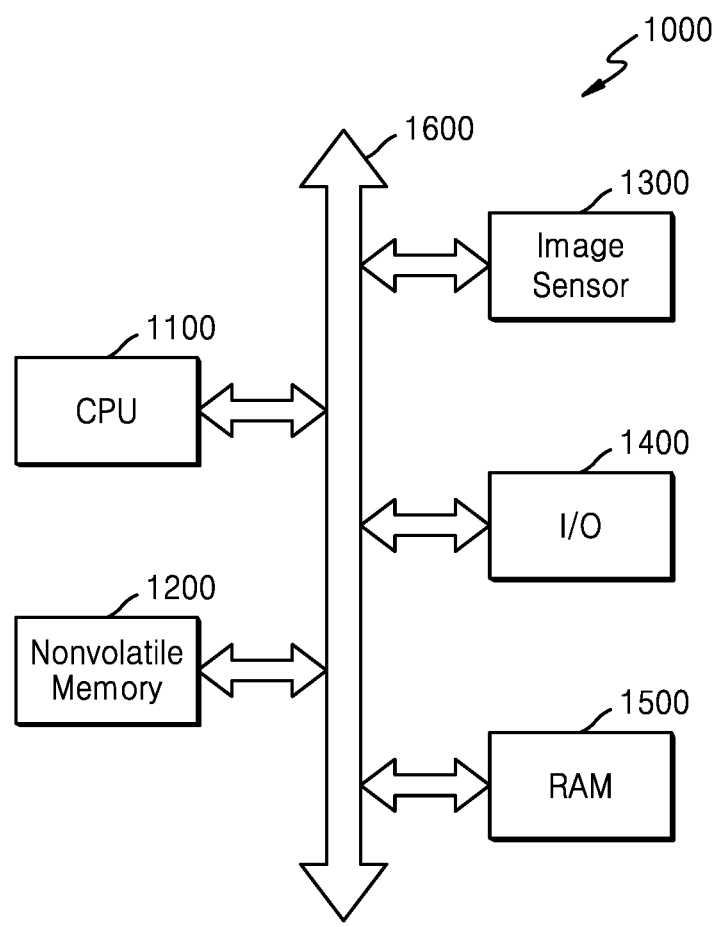
FIG. 9 illustrates a block diagram of a system including an image sensor according to an example embodiment of the inventive concepts.

FIG. 9 illustrates a block diagram of a system 1000 including an image sensor 1300 according to an example embodiment of the inventive concepts.

Referring to FIG. 9, the system 1000 may include any one of a computing system, a camera system, a scanner, a vehicle navigation system, a video phone, a security system, or a motion detection system, which requires image data.

As shown in FIG. 9, the system 1000 may include a central processing unit (CPU) (or processor) 1100, a non-volatile memory 1200, an image sensor 1300, an input/ output (I/O) device 1400, and a RAM 1500. The CPU 1100 may communicate with the non-volatile memory 1200, the image sensor 1300, the I/O device 1400, and the RAM 1500 through a bus 1600. The image sensor 1300 may be implemented as an independent semiconductor chip or combined with the CPU 1100 and implemented as one semiconductor chip. The image sensor 1300 may be implemented based on the embodiments described above with reference to FIGS. 1 to 6.

The CPU 1100 may control the system 1000 and exchange data with other components through the bus 1600. For example, the CPU 1100 may receive data generated by the image sensor 1300 according to the example embodiments of the inventive concepts. The non-volatile memory 1200, which is a memory configured to retain stored data even if power supply is cut off, may store, for example, data generated by the image sensor 1300 or data obtained by processing the generated data. The RAM 1500 may function as a data memory of the CPU 1100 and may be a volatile memory device. The I/O device 1400 may receive a command from a user of the system 1000 or output images and/or voices to the user.

While the inventive concepts have been particularly shown and described with reference to embodiments thereof, it should be understood that various changes in form and detail may be made therein without departing from the spirit and scope of the following claims.

What is claimed is:

1. A pixel array comprising a plurality of pixels, wherein each of the plurality of pixels comprises:
    a photoelectric element on a substrate and configured to generate charge from light; and
    a pixel circuit between the photoelectric element and the substrate, and configured to output a digital signal value based on an amount of the generated charge,
    wherein the pixel circuit comprises
    a floating diffusion in the substrate and configured to store the charge therein,
    a vertical pixel electrode configured to connect the floating diffusion to the photoelectric element, the vertical pixel electrode extending in a direction perpendicular to the substrate,
    an analog-to-digital converter configured to convert an electric potential of the floating diffusion into the digital signal value, and
    a memory element configured to store the digital signal value,
    wherein the memory element is located at a same level as at least a portion of the vertical pixel electrode.

2. The pixel array of claim 1, wherein the photoelectric element is any one of a quantum dot photodiode, an organic photoconductive film, and a perovskite photodiode, and does not include silicon material.

3. The pixel array of claim 1, wherein the vertical pixel electrode comprises a metal material.

4. The pixel array of claim 1, wherein the pixel circuit further comprises a reset transistor including the floating diffusion as one electrode, the reset transistor being configured to provide a reset potential to the floating diffusion during a reset operation,
    wherein the analog-to-digital converter converts the reset potential into a digital reset value during the reset operation.

5. The pixel array of claim 4, wherein the memory element is configured to store a value corresponding to the digital reset value during the reset operation.

6. An image sensor comprising a pixel array including pixels arranged in a matrix form in a plurality of row lines and a plurality of column lines, wherein each of the pixels comprises:
    a photoelectric element configured to generate charge in proportion to intensity of incident light; and
    a pixel circuit,
    the pixel circuit comprising
    a floating diffusion in a substrate, shorted with the photoelectric element, and configured to store the charge therein,
    a reset transistor configured to provide a reset potential to the floating diffusion during a reset operation,
    an analog-to-digital converter configured to generate a digital reset value based on the reset potential during the reset operation,
    a driver transistor configured to generate a signal potential according to an electric potential of the floating diffusion,
    wherein the analog-to-digital converter is configured to convert the signal potential into a digital signal value during a sampling operation,
    a memory element configured to store the digital reset value during the reset operation and the digital signal value during the sampling operation, and
    a readout circuit configured to read the digital reset value and the digital signal value from the memory element,
    wherein the pixels comprise a first pixel, and the readout circuit is configured to compare a digital reset value of a first frame period of the first pixel with a digital signal value of a second frame period of the first pixel.

7. The image sensor of claim 6, wherein a transistor is not located between the floating diffusion and the photoelectric element.

8. The image sensor of claim 6, wherein the floating diffusion is connected to the photoelectric element by a conductive interconnection comprising a metal material.

9. The image sensor of claim 6, wherein the memory element is configured to store the digital signal value during the sampling operation.

10. The image sensor of claim 9, further comprising a row driver configured to drive all the row lines during each of the first frame period and the second frame period that is subsequent to the first frame period.

11. The image sensor of claim 6, wherein the photoelectric element is any one of a quantum dot photodiode, an organic photoconductive film, and a perovskite photodiode, and does not include silicon material.

12. The image sensor of claim 6, wherein the memory element is any one of a dynamic random access memory (DRAM), a static RAM (SRAM), a phase-change RAM (PRAM), a spin transfer torque-magnetic RAM (STT-MRAM), and a resistive RAM (ReRAM).

13. An image sensor comprising:
    a pixel array comprising pixels arranged in a matrix form in a plurality of row lines and a plurality of column lines;
    a sensor circuit configured to drive the pixel array; and
    an image processor configured to control the sensor circuit and generate an image,
    wherein each of the pixels comprises
    a photoelectric element configured to generate charge in proportion to intensity of incident light, and
    a pixel circuit,
    wherein the pixel circuit comprises a floating diffusion in a substrate and configured to store the charge generated by the photoelectric element therein, a vertical pixel electrode configured to connect the photoelectric element to the floating diffusion, a reset transistor configured to provide a reset potential to the floating diffusion during a reset operation, a driver transistor configured to generate a signal potential according to an electric potential of the floating diffusion, an analog-to-digital converter configured to convert the signal potential into a digital signal value during a sampling operation and generate a digital reset value based on the reset potential during the reset operation, a memory element configured to store the digital signal value during the sampling operation and store the digital reset value during the reset operation, and a readout circuit configured to read the digital reset value and the digital signal value from the memory element, wherein the pixels comprise a first pixel, and the readout circuit compares a digital reset value of a first frame period of the first pixel with a digital signal value of a second frame period of the first pixel.

14. The image sensor of claim 13, further comprising a row driver configured to drive all the row lines during each of the first frame period and the second frame period that is subsequent to the first frame period.

15. The image sensor of claim 13, wherein the vertical pixel electrode comprises a metal material.

* * * * *